(12) United States Patent
Grosch et al.

(10) Patent No.: US 6,303,833 B1
(45) Date of Patent: Oct. 16, 2001

(54) MULTI-METAL CYANIDE COMPLEXES AS CATALYSTS AND THEIR USE IN PREPARING POLYETHERPOLYOLS

(75) Inventors: Georg Heinrich Grosch, Bad Dürkheim; Harald Larbig, Ludwigshafen; Reinhard Lorenz, Limburgerhof; Dieter Junge, Frankenthal; Eugen Gehrer, Rankweil; Ulrich Treuling, Bensheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/509,515

(22) PCT Filed: Sep. 28, 1998

(86) PCT No.: PCT/EP98/06154

§ 371 Date: Mar. 29, 2000

§ 102(e) Date: Mar. 29, 2000

(87) PCT Pub. No.: WO99/16775

PCT Pub. Date: Apr. 8, 1999

(30) Foreign Application Priority Data

Sep. 29, 1997 (DE) ............................. 197 42 978

(51) Int. Cl.$^7$ ............................. C07C 43/11; B01J 31/12
(52) U.S. Cl. .................. 568/613; 568/618; 568/620; 568/623; 568/624; 568/625; 502/152; 502/159; 502/162; 502/167; 502/175
(58) Field of Search ................................. 568/613, 618, 568/620, 623, 624, 625; 502/152, 159, 162, 167, 175

(56) References Cited

U.S. PATENT DOCUMENTS

| | | | |
|---|---|---|---|
| 5,158,922 | * 10/1992 | Hinney et al. | 502/175 |
| 5,498,583 | * 3/1996 | Le-Khac | 502/154 |

FOREIGN PATENT DOCUMENTS

| | | | |
|---|---|---|---|
| A-2228651 | 9/1998 | (CA) | C08G/65/10 |
| A-0 654 302 | 5/1995 | (EP) | B01J/27/26 |
| A-0 743 093 | 11/1996 | (EP) | B01J/27/26 |
| A-0 755 716A1 | 1/1997 | (EP) | B01J/27/26 |
| A-0 862 947A1 | 9/1998 | (EP) | B01J/27/26 |

* cited by examiner

Primary Examiner—Rosalynd Keys
(74) Attorney, Agent, or Firm—Fernando A. Borrego

(57) ABSTRACT

A crystalline multimetal cyanide complex of the formula (I)

$$M^1_a[M^2(CN)_bL^1_c]_d{}^*e(M^1_fX_g){}^*hL^2{}^iH_2O \qquad (I)$$

where $M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II, W(IV), W(VI), Cu(II), and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II), $L^1$ is at least one ligand from the group consisting of cyanide, carbonyl, cyanate, isocyanate, nitrile, thiocyanate and nitrosyl, X is a formate anion, an acetate anion or propionate anion, $L^2$ is at least one water-miscible ligand from the group consisting of alcohols, aldehydes, ketones, ethers, polyethers, esters, urea derivatives, amides, nitriles and sulfides, a, b, c, d, e, f, g, h, i are integers, with a, b, c and d being chosen so that the electrical neutrality condition is satisfied, and f and g being chosen so that the electrical neutrality condition is satisfied, the X-ray diffractogram of which shows reflections at particular d values, can be employed as catalyst.

9 Claims, 5 Drawing Sheets

MULTI-METAL CYANIDE COMPLEXES AS CATALYSTS AND THEIR USE IN PREPARING POLYETHERPOLYOLS

The invention relates to crystalline multimetal cyanide complexes, mixtures thereof, processes for their preparation, their use as catalysts and a process for preparing polyetherpolyols using this catalyst.

Tailor-made polyetherpolyols are required for preparing polyurethane foams with a wide range of properties. For example, high molecular weight polyols are used for soft foams and shorter-chain polyols are used for hard foams.

Polyetherpolyols are, as a rule, prepared from alkylene oxides in the presence of a starter using various catalysts such as bases, hydrophobic bilayer hydroxides, acidic or Lewis-acidic systems, organometallic compounds or multimetal cyanide complex compounds.

There is increasing commercial interest in long-chain polyetherpolyols which have a low content of unsaturated components. Multimetal cyanide complex compounds have proven particularly suitable as catalysts for preparing such polyetherpolyols with low contents of unsaturated components.

Multimetal cyanide complex catalysts are known per se. These are, as a rule, compounds which are difficult to characterize by X-ray analysis, are of low crystallinity and, in some cases, are X-ray amorphous, or crystalline two-metal cyanides having a cubic structure.

EP-A-0 654 302 describes improved two-metal cyanide complex catalysts. Particular mention is made of zinc hexacyanocobaltate catalysts which are employed for polymerizing epoxides.

EP-A-0 743 093 describes highly active two-metal cyanide complex catalysts. The described catalysts are essentially amorphous and are based on zinc hexacyancobaltate. They are employed for polymerizing epoxides.

EP-A-0 755 716 describes highly active two-metal cyanide complex catalysts. They are essentially crystalline and are based on zinc hexacyanocobaltate complexes.

Two-metal cyanide catalysts are regarded as suitable for polymerizing epoxides either when they are amorphous, in which case they contain more than 0.2 mol of metal salt per mole of two-metal cyanide, or when they are crystalline, in which case they contain less than 0.2 mol of metal salt per mole of two-metal cyanide.

It is an object of the present invention to provide multimetal cyanide complexes which are substantially or completely crystalline and show high catalytic activity.

Figure 1:
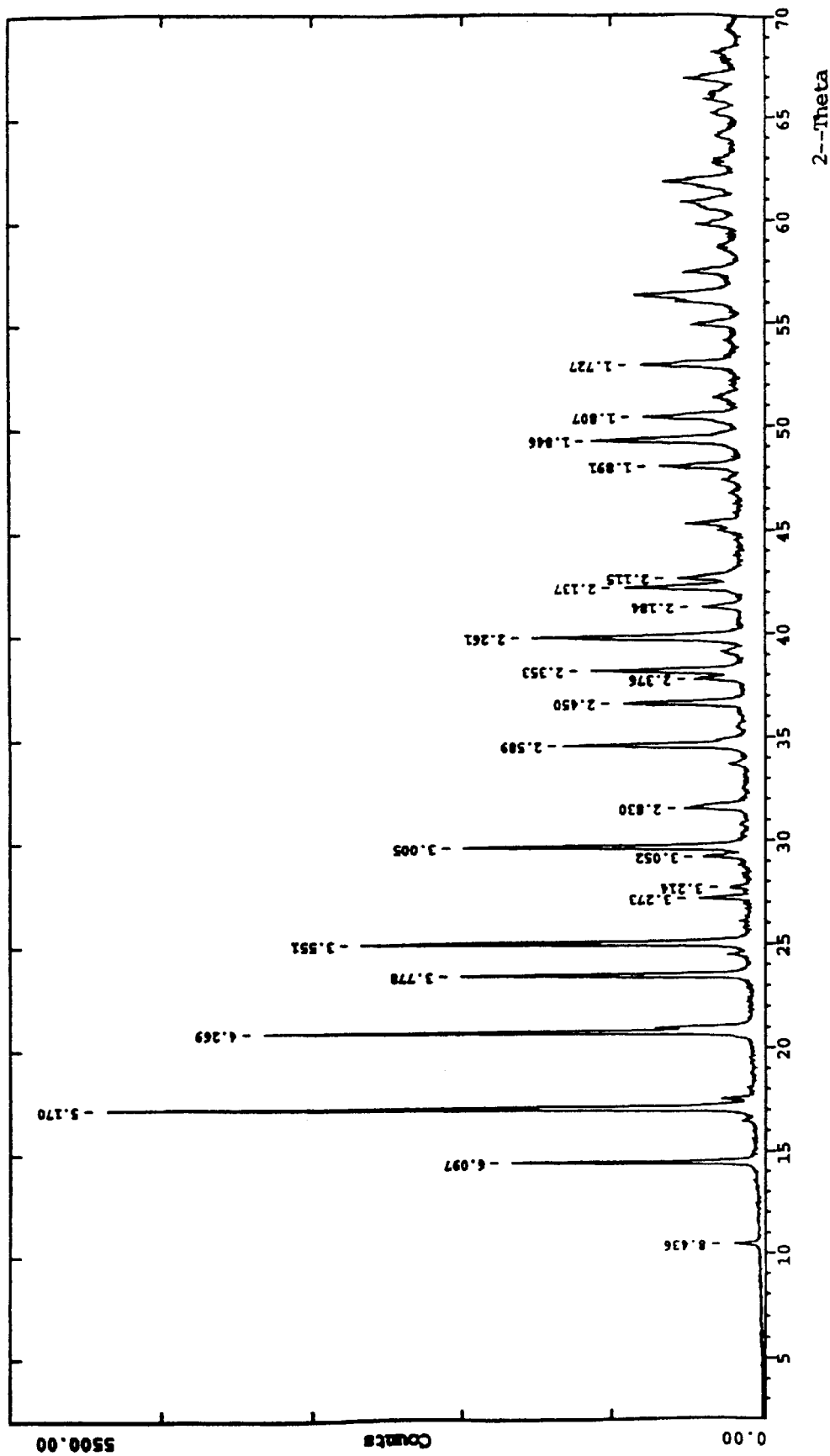
FIG. 1 is an X-ray diffractogram of a multimetal cyanide complex prepared according to Example 4b in accordance with the present invention.

We have found that this object is achieved by providing crystalline multimetal cyanide complexes of the formula (I)

$$M^1_a[M^2(CN)_b L^1_c]_d \cdot e(M^1_f X_g) \cdot hL^2 \cdot iH_2O \qquad (I)$$

where
  $M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III),
  $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II),
  $L^1$ is at least one ligand from the group consisting of cyanide, carbonyl, cyanate, isocyanate, nitrile, thiocyanate and nitrosyl,
  X is a formate anion, acetate anion or propionate anion,
  $L^2$ is at least one water-miscible ligand from the group consisting of alcohols, aldehydes, ketones, ethers, polyethers, esters, urea derivatives, amides, nitriles and sulfides,
  a, b, c, d, e, f, g, h, i are integers, with
    a, b, c and d being chosen so that the electrcal neutrality condition is satisfied, and
    f and g being chosen so that the electrical neutrality condition is satisfied, and
the X-ray diffractogram thereof shows reflections at least at the d values of
  6.10 Å±0.04 Å
  5.17 Å±0.04 Å
  4.27 Å±0.02 Å
  3.78 Å±0.02 Å
  3.56 Å±0.02 Å
  3.004 Å±0.007 Å
  2.590 Å±0.006 Å
  2.354 Å±0.004 Å
  2.263 Å±0.004 Å
  when X is a formate anion,
the X-ray diffractogram thereof shows reflections at least at the d values of
  5.20 Å±0.02 Å
  4.80 Å±0.02 Å
  3.75 Å±0.02 Å
  3.60 Å±0.02 Å
  3.46 Å±0.01 Å
  2.824 Å±0.008 Å
  2.769 Å±0.008 Å
  2.608 Å±0.007 Å
  2.398 Å±0.006 Å
  when X is an acetate anion,
and the X-ray diffractogram thereof shows reflections at least at the d values of
  5.59 Å±0.05 Å
  5.40 Å±0.04 Å
  4.08 Å±0.02 Å
  3.94 Å±0.02 Å
  3.766 Å±0.02 Å
  3.355 Å±0.008 Å
  3.009 Å±0.007 Å
  2.704 Å±0.006 Å
  2.381 Å±0.004 Å
  when X is a propionate anion.

Moreover the multimetal cyanide complexes preferably show the above d values as the mainly occurring values.

It is preferred for at least the following d values to occur. In particular, the d values have the following relative intensities $I^{rel}$ based in each case on the strongest reflection in the spectrum (=100%)

when X is a formate anion:

| | |
|---|---|
| 8.42Å ± 0.04Å | ($I_{rel}$ = 7) |
| 6.10Å ± 0.04Å | ($I_{rel}$ = 40) |
| 5.16Å ± 0.04Å | ($I_{rel}$ = 100) |
| 4.26Å ± 0.02Å | ($I_{rel}$ = 80) |
| 3.78Å ± 0.02Å | ($I_{rel}$ = 50) |
| 3.55Å ± 0.02Å | ($I_{rel}$ = 60) |
| 3.27Å ± 0.01Å | ($I_{rel}$ = 15) |
| 3.213Å ± 0.008Å | ($I_{rel}$ = 5) |
| 3.053Å ± 0.008Å | ($I_{rel}$ = 15) |
| 3.004Å ± 0.007Å | ($I_{rel}$ = 50) |
| 2.828Å ± 0.006Å | ($I_{rel}$ = 17) |
| 2.590Å ± 0.006Å | ($I_{rel}$ = 30) |
| 2.449Å ± 0.004Å | ($I_{rel}$ = 23) |
| 2.375Å ± 0.004Å | ($I_{rel}$ = 10) |
| 2.354Å ± 0.004Å | ($I_{rel}$ = 25) |
| 2.263Å ± 0.004Å | ($I_{rel}$ = 34) |
| 2.184Å ± 0.004Å | ($I_{rel}$ = 10) |
| 2.137Å ± 0.004Å | ($I_{rel}$ = 22) |
| 2.115Å ± 0.004Å | ($I_{rel}$ = 17) |
| 1.891Å ± 0.004Å | ($I_{rel}$ = 20) |
| 1.846Å ± 0.004Å | ($I_{rel}$ = 26) |
| 1.807Å ± 0.004Å | ($I_{rel}$ = 22) |
| 1.727Å ± 0.004Å | ($I_{rel}$ = 22) |

When X is an acetate anion:

| | |
|---|---|
| 8.45Å ± 0.04Å | ($I_{rel}$ = 4) |
| 6.40Å ± 0.04Å | ($I_{rel}$ = 2) |
| 6.16Å ± 0.04Å | ($I_{rel}$ = 7) |
| 5.60Å ± 0.04Å | ($I_{rel}$ = 5) |
| 5.20Å ± 0.02Å | ($I_{rel}$ = 100) |
| 5.01Å ± 0.02Å | ($I_{rel}$ = 3) |
| 4.80Å ± 0.02Å | ($I_{rel}$ = 45) |
| 4.72Å ± 0.02Å | ($I_{rel}$ = 7) |
| 4.23Å ± 0.02Å | ($I_{rel}$ = 7) |
| 4.11Å ± 0.02Å | ($I_{rel}$ = 5) |
| 4.05Å ± 0.02Å | ($I_{rel}$ = 4) |
| 3.91Å ± 0.02Å | ($I_{rel}$ = 9) |
| 3.75Å ± 0.02Å | ($I_{rel}$ = 25) |
| 3.60Å ± 0.02Å | ($I_{rel}$ = 44) |
| 3.46Å ± 0.01Å | ($I_{rel}$ = 42) |
| 3.34Å ± 0.01Å | ($I_{rel}$ = 5) |
| 3.24Å ± 0.01Å | ($I_{rel}$ = 6) |
| 3.09Å ± 0.01Å | ($I_{rel}$ = 5) |
| 2.824Å ± 0.008Å | ($I_{rel}$ = 13) |
| 2.769Å ± 0.008Å | ($I_{rel}$ = 15) |
| 2.703Å ± 0.008Å | ($I_{rel}$ = 5) |
| 2.608Å ± 0.007Å | ($I_{rel}$ = 40) |
| 2.398Å ± 0.006Å | ($I_{rel}$ = 16) |
| 2.254Å ± 0.006Å | ($I_{rel}$ = 16) |
| 2.037Å ± 0.006Å | ($I_{rel}$ = 14) |
| 1.876Å ± 0.004Å | ($I_{rel}$ = 13) | and when X is a propionate anion:

| | |
|---|---|
| 10.10Å ± 0.1Å | ($I_{rel}$ = 12) |
| 5.59Å ± 0.05Å | ($I_{rel}$ = 45) |
| 5.40Å ± 0.04Å | ($I_{rel}$ = 100) |
| 5.03Å ± 0.04Å | ($I_{rel}$ = 4) |
| 4.71Å ± 0.02Å | ($I_{rel}$ = 5) |
| 4.08Å ± 0.02Å | ($I_{rel}$ = 22) |
| 4.03Å ± 0.02Å | ($I_{rel}$ = 5) |
| 3.94Å ± 0.02Å | ($I_{rel}$ = 30) |
| 3.76Å ± 0.02Å | ($I_{rel}$ = 32) |
| 3.355Å ± 0.008Å | ($I_{rel}$ = 15) |
| 3.260Å ± 0.008Å | ($I_{rel}$ = 7) |
| 3.009Å ± 0.007Å | ($I_{rel}$ = 17) |
| 2.930Å ± 0.008Å | ($I_{rel}$ = 7) |
| 2.804Å ± 0.006Å | ($I_{rel}$ = 8) |
| 2.704Å ± 0.006Å | ($I_{rel}$ = 24) |
| 2.515Å ± 0.004Å | ($I_{rel}$ = 5) |
| 2.38Å ± 0.004Å | ($I_{rel}$ = 21) |
| 2.311Å ± 0.004Å | ($I_{rel}$ = 18) |

Figure 2:
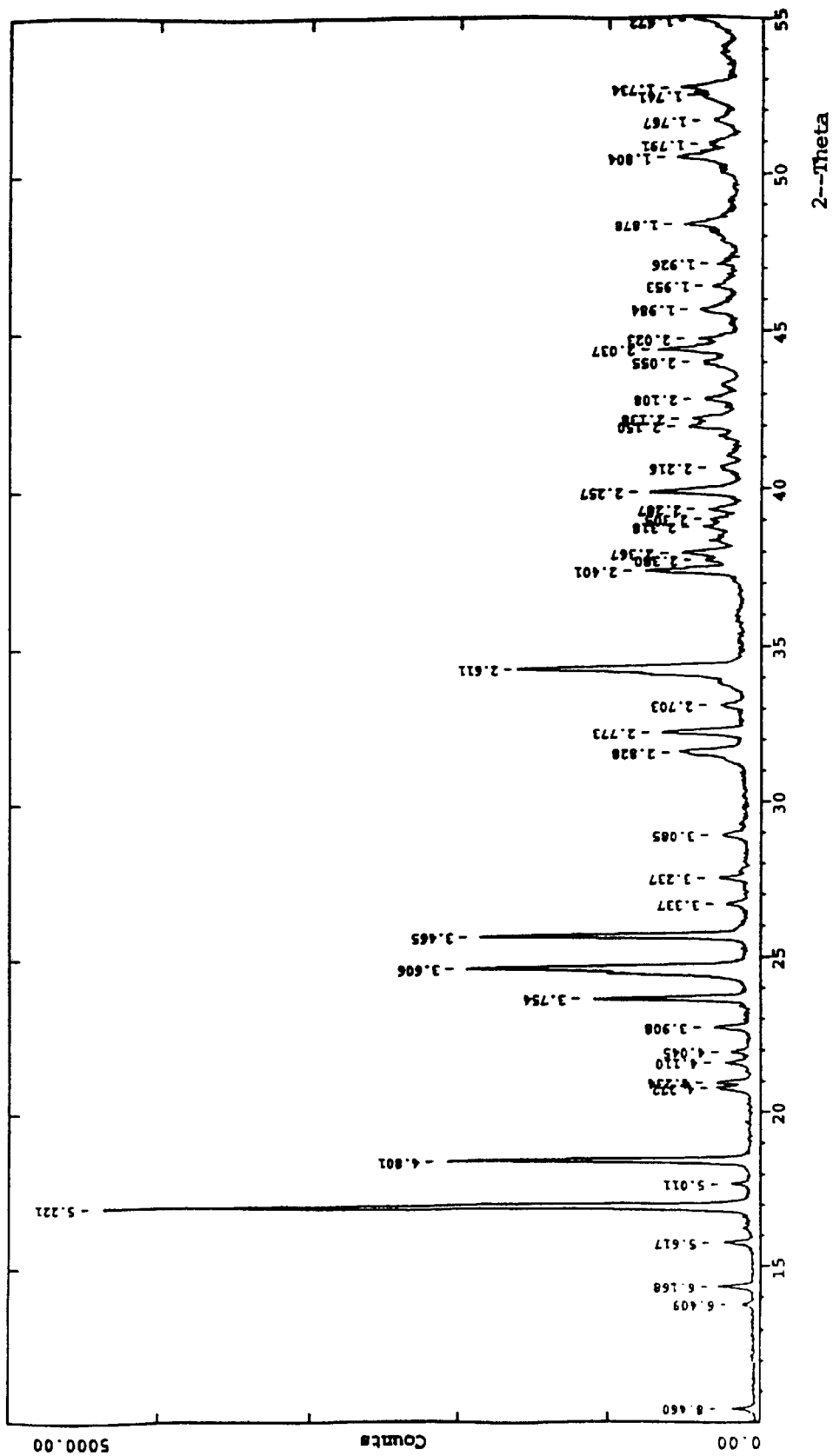
FIG. 2 is an X-ray diffractogram of a multimetal cyanide complex prepared according to Example 1b in accordance with the present invention.
Figure 3:
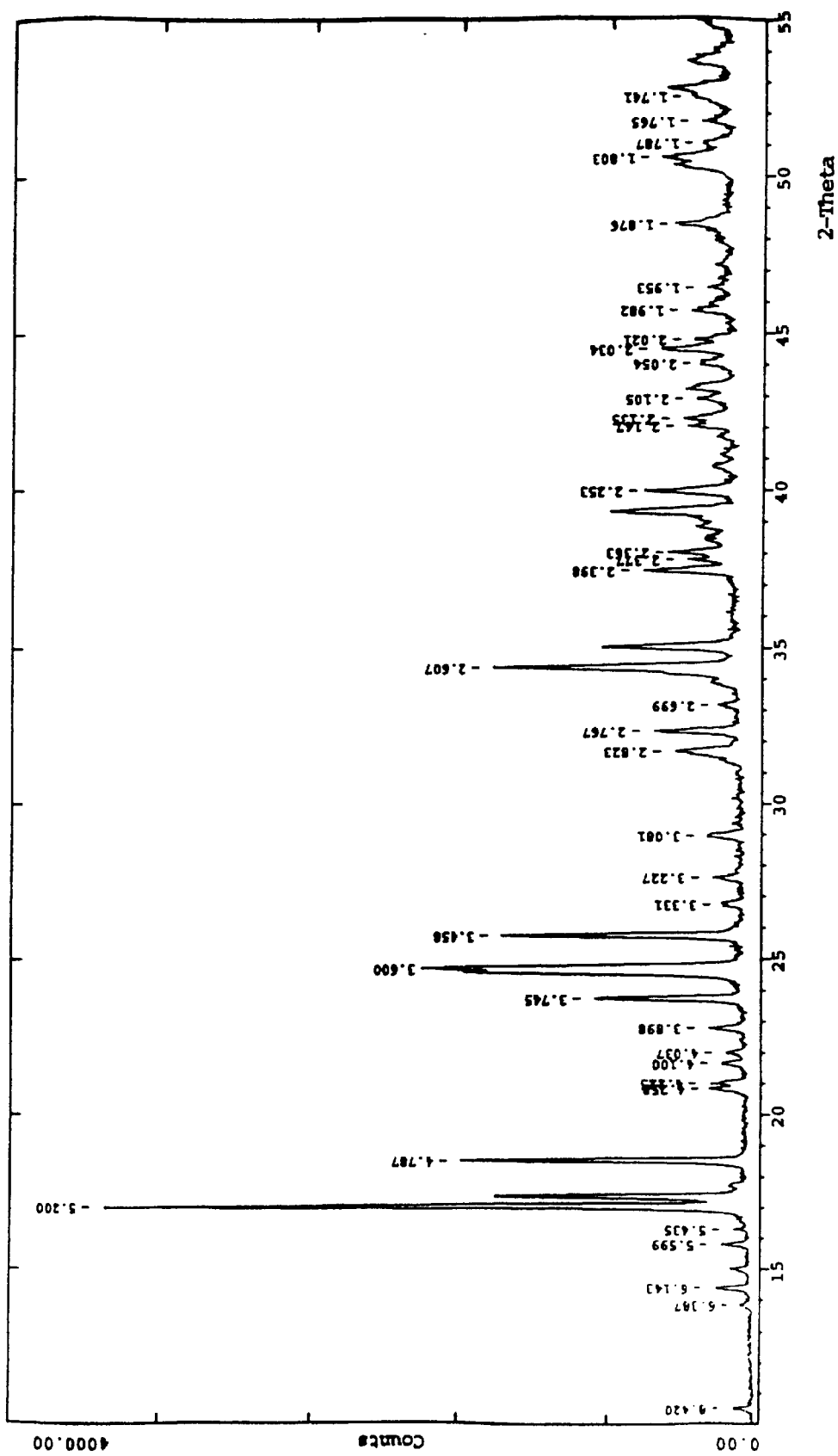
FIG. 3 is an X-ray diffractogram of a multimetal cyanide complex prepared according to Example 2b in accordance with the present invention.
Figure 4:
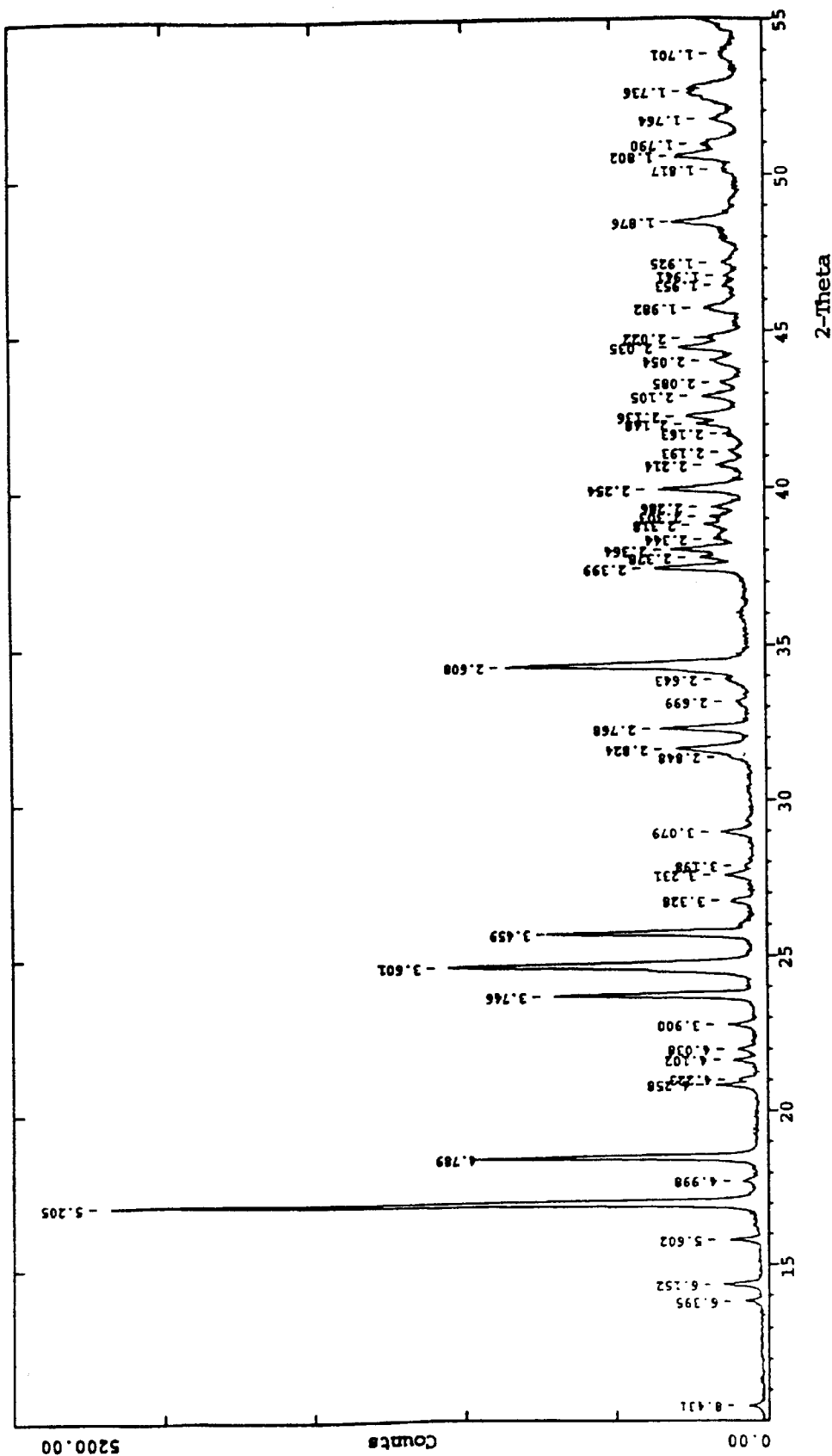
FIG. 4 is an X-ray diffractogram of a multimetal cyanide complex prepared according to Example 3 in accordance with the present invention.
Figure 5:
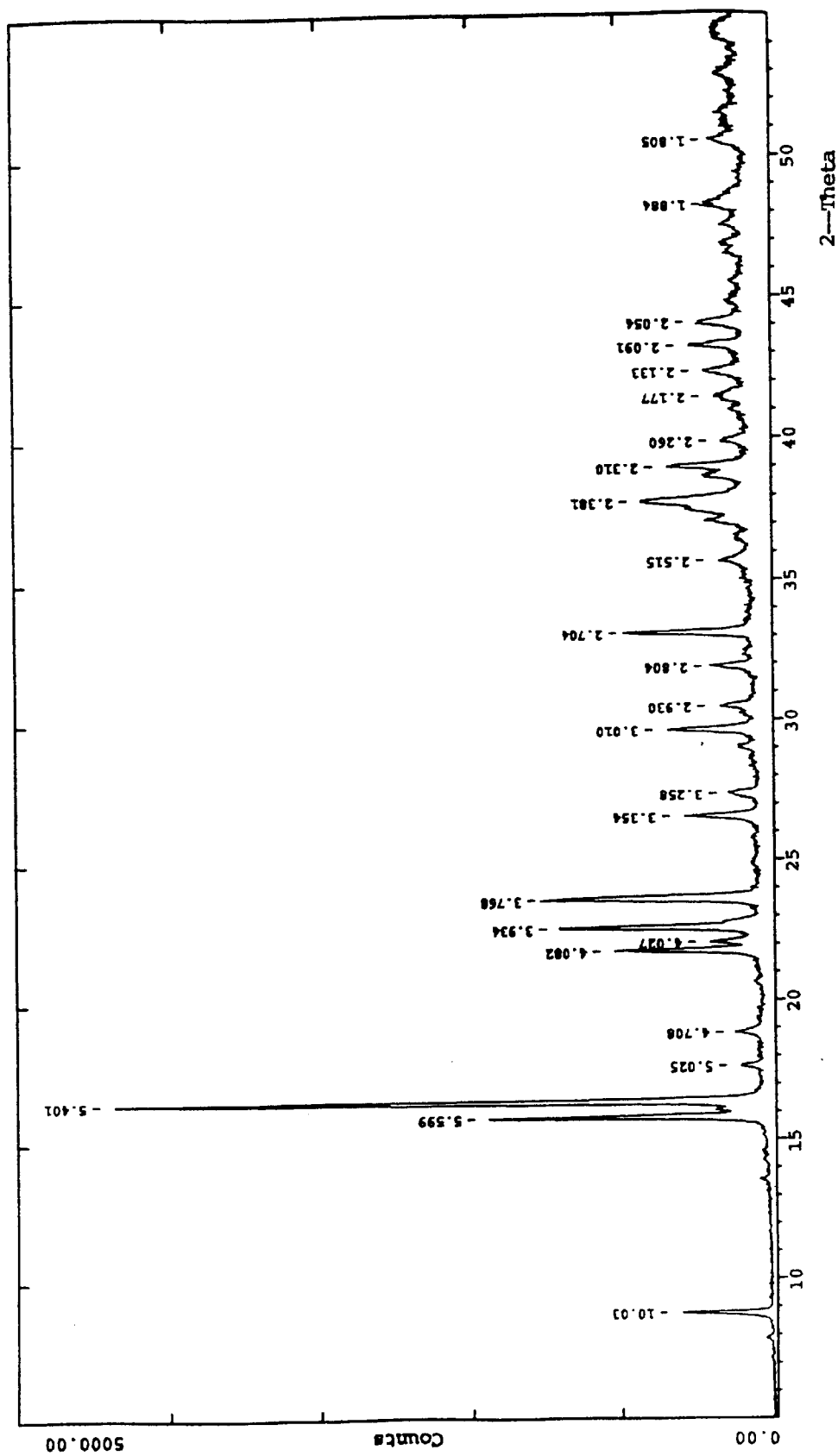
FIG. 5 is an X-ray diffractogram of a multimetal cyanide complex prepared according to Example 5b in accordance with the present invention.

The X-ray diffractograms were determined at a wavelength of 1.5406 Å at room temperature. Corresponding X-ray diffractograms are depicted in the appended drawings for X=formate in FIG. 1, for X=acetate in FIGS. 2 to 4, and for X=propionate in FIG. 5. They are explained in detail in the examples.

The invention likewise relates to crystalline multimetal cyanide complexes of the formula (I) with the abovementioned meanings of the components, where X is an acetate anion, the X-ray diffractograms of which show reflections which correspond to a monoclinic unit cell with the lattice parameters a=12.38 Å±0.05 Å, b=7.50 Å±0.05 Å, c=8.49 Å±0.05 Å, $\hat{a}$=90°, $\hat{a}$=94.5°±0.5°, $\hat{a}$=90°. Moreover they preferably show the reflections listed above with the stated relative intensities $I_{rel}$.

The multimetal cyanide complexes according to the invention can be obtained in partly, predominantly or completely crystalline form. The invention also relates to a mixture of multimetal cyanide complexes of the formula (I) with the abovementioned meanings for $M^1$, $M^2$, $L^1$, X, $L^2$, a, b, c, d, e, f, g, h and i, where at least 20% by weight of the mixture consist of the crystalline complexes described above. It is particularly preferred for at least 50% by weight, in particular at least 90% by weight, specifically at least 95% by weight, of the mixture to consist of the crystalline complexes detailed above. It is moreover preferred for, in each case, only one radical to be present in the mixture, ie. X is a forinate, acetate or propionate anion.

Preferred crystalline multimetal cyanide complexes of the formula (I) are those having the following features:

$M^1$ and $M^2$ may be identical to or different from one another. It is possible in each case for there to be mixtures of elements or, preferably, one element.

$M^1$ is an element from the group consisting of Zn(II), Fe(II), Ni(II), Mn(II) or Co(II), particularly preferably Zn(II), $M^2$ is at least one element from the group consisting of Co(II), Fe(II), Mn(III), Rh(III), Ir(III), Co(II), Fe(II), particularly preferably Co(III), Fe(III), Rh(III), Ir(III), Mn(III), $L^1$ is at least one ligand from the group consisting of cyanide, nitrosyl, carbonyl, cyanate, particularly preferably cyanide, nitrosyl, $L^2$ is at least one water-miscible ligand from the group consisting of alcohols, ketones, ethers, polyethers and esters, and mixtures thereof, preferably alcohols, ethers, polyethers and mixtures thereof.

Preferred values for b and c are b=6, c=0.

The complexes particularly preferably have one or more, in particular all, of the following features:

$M^1$=Zn (II)
$M^2$=Co (III), Fe(III)
$L^1$=CN $L^2$=tert-butanol h or i can be equal to zero.

The multimetal cyanide complexes or mixtures according to the invention can be prepared by reacting cyanometalic acids of at least one element $M^2$ from the group consisting of Fe(II), Fe(III), Co(III), Cr(III), Mn(II), Mn(II), Ir(III), Rh(III), Ru(II), V(IV), V(V), Co(II) and Cr(II), with formates, acetates or propionates of at least one element $M^1$ from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III)

in the presence of at least one water-miscible ligand $L^2$ from the group consisting of alcohols, aldehydes, ketones, ethers, polyethers, esters, urea derivatives, arnides, nitriles and sulfides.

It has been found according to the invention that the crystalline and highly active two-metal cyanide complexes can be prepared by reacting cyanometalic acids with metal carboxylates in the presence of a water-miscible organic and heteroatom-containing ligand.

The cyanometalic acid employed for this purpose is, for example, $H_3[Co(CN)_6]\cdot nH_2O$. The metal formates, metal acetates or metal propionates are preferably zinc formate, zinc acetate or zinc propionate, can also be obtained from other metal salts.

Cyanometalic acids are compounds which can be handled very readily in aqueous solution. Several processes are known for the preparation of cyanometalic acids. For example, they can be prepared starting from alkali metal cyanometalate via the silver cyanometalate, compare W. Klernm et al., Z. Anorg. Allg. Chem. 308 (1961) 179. It is furthermore possible to convert alkali metal or alkaline earth metal cyanometalates with an acidic ion exchanger into the cyanometalic acid, cf. F. Hein, H. Lilie, Z. Anorg. Allg. Chem. 270 (1952) 45, A. Ludi et al., Helv. Chim. Acta 50 (1967) 2035. Further possible syntheses are detailed in G. Brauer (editor) "Handbuch der praparativen anorganischen Chemie", Ferdinand Enke Verlag, Stuttgart 1981. The reaction of alkali metal or alkaline earth metal cyanometalates on acidic ion exchangers is preferred. Use of an acidic ion exchanger results in aqueous cyanometalic acid solutions which can be further processed immediately or else stored. On prolonged storage, the cyanometalic acid solutions should be stored in opaque containers. This can be ignored if the freshly prepared cyanometalic acid solutions are immediately processed further.

When preparing the complexes according to the invention, the content of cyanometalic acid in the solution should be, based on the total amount of cyanometalate complexes, at least 50% by weight, preferably at least 80% by weight, particularly preferably at least 90% by weight.

The content of alkali metal cyanometalate should thus be below 50% by weight, preferably below 20% by weight, particularly preferably below 10% by weight.

It is preferred to employ the formate, acetate or propionate of at least one element $M^1$ in an excess by comparison with the cyanometalic acid. The molar ratios of the metal ion to the cyanometalate component are preferably from 1.1 to 7.0, particularly preferably from 1.2 to 5.0, especially from 1.3 to 3.0. It is possible in this connection to add the cyanometalic acid solution to the metal salt solution. However, it is preferred to add the metal salt solution to the cyanometalic acid solution.

The combining of the metal salt solution with the cyanometalic acid solution to result in a suspension is followed by addition of a water-miscible organic component containing heteroatoms (ligand $L^2$).

The ligand $L^2$ is preferably added to the suspension resulting after the metal salt solution has been combined with the cyanometalic acid solution, but it can also be added to one or both of the precursor solutions. In this case, it is preferably added to the cyanometalic acid solution.

The multimetal cyanide complexes treated with the ligand $L^2$ are, following the synthesis, either filtered or centrifuiged, preferably filtered. The solids obtained in this way are dried under mild conditions, preferably under slightly reduced pressure.

The two-metal cyanide complexes obtained in this way are, as a rule, satisfactorily crystalline. As a rule, they result as multiphase crystalline powders. It is possible in this case to prepare the crystalline multimetal cyanide complexes detailed above essentially pure or completely pure. In this case, the X-ray diffractogram shows, inter alia, the reflections detailed above. The differences in the d values are related to the type and amount of the ligand $L^2$ used in each case. This also has an effect on the relative intensities of the reflections.

The proportion of the crystalline (active) phase described above in the multimetal cyanide complexes is preferably at least 20%, particularly preferably at least 50%, especially at least 90%, specifically at least 95%, based on the total weight of the multimetal cyanide complexes. Other phases which may be present are other crystalline or amorphous phases containing two-metal cyanides. However, the complexes preferably contain no other phases.

The complexes or mixtures can be used as catalysts or for preparing unsupported or supported catalysts.

In this connection, the catalyst comprises the above complexes, with or without a carrier. These catalysts can be employed in particular for the alkoxylation of compounds which have active hydrogen atoms using alkylene oxides. Suitable and preferred alkylene oxides in this connection are ethylene oxide, propylene oxide and/or butylene oxide. Active hydrogen atoms are present, for example, in hydroxyl groups or primary and secondary amino groups.

The catalysts are preferably employed in a process for preparing polyetherpolyols by reacting diols or polyols with ethylene oxide, propylene oxide, butylene oxide or mixtures thereof. Because of their high activity, the amount of multimetal cyanide complexes can be kept low. The amount, based on the weight of product to be generated, is preferably less than 0.5% by weight. Contents of less than 500 ppm are particularly preferred, especially less than 250 ppm.

The diols or polyols may moreover already contain alkylene oxide groups. An example of a diol which can be employed is an oligopropylene glycol which is obtained by alkali-catalyzed reaction of dipropylene glycol with propylene oxide.

The invention is explained in detail by means of Examples below.

EXAMPLES

Preparation of the Multimetal Cyanide Complexes

Example 1a 400 ml of strongly acidic ion exchanger (K2431 from Bayer) are regenerated twice with 180 g of HCl (37% HCl content) and then washed with water until the washings are neutral. Then a solution of 46.6 g of $K_3[Co(CN)_6]$ in 130 ml of water is loaded onto the exchanger column. The column is then eluted until the outflow is neutral again. The Co:K ratio in the collected eluate was greater than 10:1. The amount of collected eluate was 647 g.

Example 1b (acetate)

323 g of eluate from Example 1a are maintained at 40° C. and, while stirring, a solution of 20.0 g of Zn(II) acetate dihydrate in 70 g of water is added. Then 69.1 g of tert-butanol are added with stirring, and the suspension is stirred at 40° C. for a further 30 min. The solid is then filtered off with suction and washed on the filter with 100 ml of tert-butanol. The solid treated in this way is dried at room temperature. An X-ray diffractogram of the dried solid was recorded (see FIG. 2). The diffractogram shows the pure active phase.

Example 2a 400 ml of strongly acidic ion exchanger (K2431 from Bayer) are regenerated twice with 180 g of HCl (37% HCl content) and then washed with water until the washings are neutral. Then a solution of 40.4 g of $K_3[Co(CN)_6]$ in 130 ml of water is loaded onto the exchanger column. The column is then eluted until the outflow is neutral again. The Co:K ratio in the collected eluate was greater than 10:1. The amount of collected eluate was 630 g.

Example 2b (acetate)

315 g of eluate from Example 2a are maintained at 40° C. and, while stirring, a solution of 20.0 g of Zn(II) acetate dihydrate in 70 g of water is added. Then 69.1 g of tert-butanol are added with stirring, and the suspension is stirred at 40° C. for a further 30 min. The solid is then filtered off with suction and washed on the filter with 100 ml of tert-butanol. The solid treated in this way is dried at room temperature. An X-ray diffractogram of the dried solid was recorded (see FIG. 3, C means counts). The diffractogram shows not only the active phase but also proportions of a cubic minor phase.

Example 3 (acetate)

200 ml of strongly acidic ion exchanger (K2431 from Bayer) are regenerated twice with 90 g of HCl (37% HCl content) and then washed with water until the washings are neutral. Then a solution of 16.8 g of $K_3[Co(CN)_6]$ in 50 ml of water is loaded onto the exchanger column. The column is then eluted until the outflow is neutral again. The Co:K ratio in the collected eluate was greater than 10:1. The 342 g of eluate are maintained at 40° C. while 34 g of tert-butanol are added and then, while stirring, a solution of 20.0 g of Zn(II) acetate dihydrate in 70 ml of water is added. The suspension is stirred at 40° C. for a further 10 min and then 35.1 g of tert-butanol are added and the suspension is stirred at 40° C. for a further 30 min. The solid is then filtered off with suction and washed on the filter with 300 ml of tert-butanol. The solid treated in this way is dried at room temperature. An X-ray diffractogram of the dried solid was recorded (see FIG. 4). The diffractogram shows no other minor phases beside the active phase.

Example 4a 400 ml of strongly acidic ion exchanger (K2431 from Bayer) are regenerated twice with 180 g of HCl (37% HCl content) and then washed with water until the washings are neutral. Then a solution of 30 g of $K_3[Co(CN)_6]$ in 130 ml of water is loaded onto the exchanger column. The column is then eluted until the outflow is neutral again. The Co:K ratio in the collected eluate was greater than 10:1. The amount of collected eluate was 625 g.

Example 4b (formate)

20.4 g of basic zinc carbonate ($ZnCO_3$'$2Zn(OH)_2$'$x×H_2O$) (F.W.=324.15 g/mol, Aldrich) are added to 470 g of water and 14.5 g of formic acid in a beaker and stirred until the basic zinc carbonate has completely dissolved and evolution of $CO_2$ has ceased. The zinc formate solution produced in this way is maintained at 60° C. while 208 g of eluate from Example 4a are added with stirring. Then 69.1 g of tert-butanol are added with stirring, and the suspension is stirred at 60° C. for a further 30 min. The solid is then filtered off with suction and washed on the filter with 100 ml of tert-butanol. The solid treated in this way is dried at room temperature. An X-ray diffractogram of the dried solid was recorded (see FIG. 1). The diffractogram shows the active phases produced.

Example 5a 400 ml of strongly acidic ion exchanger (K2431 from Bayer) are regenerated twice with 180 g of HCl (37% HCl content) and then washed with water until the washings are neutral. Then a solution of 30 g of $K_3[Co(CN)_6]$ in 130 ml of water is loaded onto the exchanger column. The column is then eluted until the outflow is neutral again. The Co:K ratio in the collected eluate was greater than 10:1. The amount of collected eluate was 576 g.

Example 5b (propionate)

20.4 g of basic zinc carbonate ($ZnCO_3$'$2Zn(OH)_2$'$x×H_2O$) (F.W.=324.15 g/mol, Aldrich) are added to 900 g of water and 25 g of propionic acid in a beaker and stirred until the basic zinc carbonate has completely dissolved and evolution of $CO_2$ has ceased. The zinc propionate solution produced in this way is maintained at 40° C. while 192 g of eluate from Example 5a are added with stirring. Then 69.1 g of tert-butanol are added with stirring, and the suspension is stirred at 40° C. for a further 30 min. The solid is then filtered off with suction and washed on the filter with 100 ml of tert-butanol. The solid treated in this way is dried at room temperature. An X-ray diffractogram of the dried solid was recorded (see FIG. 5). The diffractogram shows the active phases produced.

Synthesis of Polyetherpolyols

The starter used in the following Examples 6 to 10 is an oligopropylene glycol which was obtained by alkali-catalyzed reaction of dipropylene glycol with propylene oxide at 105° C. This oligopropylene glycol was freed of catalyst using a magnesium silicate (OH number: 280 mg KOH/g; unsaturated components: 0.003 meq/g, Na, K: less than 1 ppm).

Example 6

Synthesis of Polyetherpolyol Using the Catalyst from Example 1

514 g of an oligopropylene glycol are mixed with 0.06 g of the catalyst from Example 1 (corresponding to 24 ppm based on the finished product) in a stirred autoclave under a nitrogen atmosphere. The vessel is evacuated and then 150 g of propylene oxide are metered in at 105° C. The start of the reaction is evident from the onset, after 22 min, of a fall in the pressure which is initially 2.8 bar abs. after the metering of alkylene oxide. After the propylene oxide has completely reacted, a further 1814 g of propylene oxide are fed in at the same temperature so that the pressure does not exceed 1.8 bar. The metering period is finished after 54 min. The reaction is complete 20 min after the finish of the metering period, as is evident from the pressure signal.

The resulting polyetherol is not filtered. It has a hydroxyl number of 56.3 mg KOH/g, a content of unsaturated components of 0.0118 meq/g, a zinc content of 8 ppm and a cobalt content of 3 ppm.

Example 7

Synthesis of Polyetherpolyol Using the Catalyst from Example 2

518.5 g of an oligopropylene glycol are mixed with 0.05 g of the catalyst from Example 2 (corresponding to 20 ppm based on the finished product) in a stirred autoclave under a nitrogen atmosphere. The vessel is evacuated and then 150 g of propylene oxide are metered in at 105° C. The start of the reaction is evident from the onset, after 30 min, of a fall in the pressure which is initially 3.0 bar abs. after the metering of alkylene oxide. After the propylene oxide has completely reacted, a further 1831.5 g of propylene oxide are fed in at the same temperature so that the pressure does not exceed 4.4 bar. The metering period is finished after 48 min. The reaction is complete 24 min after the finish of the metering period, as is evident from the pressure signal.

The resulting polyetherol is not filtered. It has a hydroxyl number of 56.0 mg KOH/g, a content of unsaturated components of 0.0125 meq/g, a zinc content of 5 ppm and a cobalt content of 3 ppm.

Example 8

Synthesis of Polyetherpolyol Using the Catalyst from Example 3

516 g of an oligopropylene glycol are mixed with 0.25 g of the catalyst from Example 3 (corresponding to 100 ppm based on the finished product) in a stirred autoclave under a nitrogen atmosphere. The vessel is evacuated and then 150 g of propylene oxide are metered in at 105° C. The start of the reaction is evident from the onset, after 26 min, of a fall in the pressure which is initially 2.8 bar abs. after the metering of alkylene oxide. After the propylene oxide has completely reacted, a further 1822 g of propylene oxide are fed in at the same temperature so that the pressure does not exceed 2.8 bar. The metering period is finished after 52 min. The reaction is complete 14 min after the finish of the metering period, as is evident from the pressure signal.

The resulting polyetherol is filtered twice. It has a hydroxyl number of 56.8 mg KOH/g, a content of unsaturated components of 0.0121 meq/g, a zinc content of 8 ppm and a cobalt content of 4 ppm.

Example 9

Synthesis of Oligopropylene Glycol Using the Catalyst from Example 4

128 g of an oligopropylene glycol are mixed with 0.05 g of the catalyst from Example 4 (corresponding to 250 ppm based on the finished product) in an autoclave under a nitrogen atmosphere. The autoclave is evacuated and then 72 g of propylene oxide are metered in at 130° C. The start of the reaction is evident from the onset, after 65 min, of a fall in the pressure which is initially 8 bar abs. after the metering of alkylene oxide. After 30 min, complete reaction of the propylene oxide was shown by the pressure remaining constant.

Example 10

Synthesis of Polyetherpolyol Using the Catalyst from Example 5

513 g of an oligopropylene glycol are mixed with 0.25 g of the catalyst from Example 5 (corresponding to 100 ppm based on the finished product) in a stirred autoclave under a nitrogen atmosphere. The vessel is evacuated and then 150 g of propylene oxide are metered in at 105° C. The start of the reaction is evident from the onset, after 40 min, of a fall in the pressure which is initially 3.0 bar abs. after the metering of alkylene oxide. After the propylene oxide has completely reacted, a further 1847 g of propylene oxide are fed in at the same temperature so that the pressure does not exceed 4.0 bar. The metering period is finished after 43 min. The reaction is complete 14 min after the finish of the metering period, as is evident from the pressure signal.

The resulting polyetherol is filtered twice. It has a hydroxyl number of 55.9 mg KOH/g, a content of unsaturated components of 0.0432 meq/g, a zinc content of 6 ppm and a cobalt content of 3 ppm.

We claim:

1. A crystalline multimetal cyanide complex of the formula (I)

$$M^1_a[M^2(CN)_b L^1_c]_d * e(M^1_f X_g) * hL^2 * iH_2O \quad (I)$$

where $M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II), $L^1$ is at least one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, aldehydes, ketones, ethers, polyethers, esters, urea derivatives, amides, nitrites and sulfides, a, b, c, d, e, f, g, h, i, are integers, with a, b, c, and d being chosen so that the electrical neutrality condition is satisfied, and f and g being chosen so that the electrical neutrality condition is satisfied, and the X-ray diffractogram thereof shows reflections at least at the d values of 6.10 Å±0.04 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å when X is a formate anion, the X-ray diffractogram thereof shows reflections at least at the d values of 5.20 Å±0.02 Å
4.80 Å±0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å when X is an acetate anion,
and the X-ray diffractogram thereof shows reflections at least at the d values of 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å when X is a propionate anion;
which crystalline multimetal cyanide complex can be prepared by reacting cyanometalic acids of at least one element $M^2$ from the group consisting of Fe(II), Fe(III), Co(III), Cr(III), Mn(II), Mn(III), Ir(III), Rh(III), Ru(II), V(IV), V(V), Co(II) and Cr(II),
with formates, acetates or propionates of at least one element $M^1$ from the group consisting of
Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), Cu(II), and Cr(III)
in the presence of at least one water-miscible $L^2$ from the group consisting of alcohols, aldehydes, ketones, ethers, polyethers, esters, urea derivatives, amides, nitriles and sulfides.

2. A crystalline multimetal cyanide complex of the formula (I)

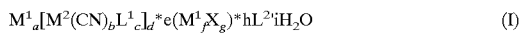

where
$M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III),
$M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II),
$L^1$ is at least one ligand from the group consisting of cyanide, carbonyl, cyanate, isocyanate, nitrile, thiocyanate and nitrosyl,
X is an acetate anion,
$L^2$ is at least one water-miscible ligand from the group consisting of alcohols, aldehydes, ketones, ethers, polyethers, esters, urea derivatives, amides, nitrites and sulfides,
a, b, c, d, e, f, g, h, i are integers, with
a, b, c, and d being chosen so that the electrical neutrality condition is satisfied, and f and g being chosen so that the electrical neutrality condition is satisfied,
the X-ray diffractogram of which shows reflections which correspond to a monoclinic unit cell with the lattice parameters
a=12.38 Å±0.05 Å, b=7.50 Å±0.05 Å,
c=8.49 Å±0.05 Å, α=90°, β=94.5°±0.5°, γ=90°, which can be prepared by reacting cyanometalic acids of at least one element $M^2$ from the group consisting of Fe(II), Fe(III), Co(III), Cr(III), Mn(II), Mn(III), Ir(III), Rh(III), Ru(II), V(IV), V(V), Co(II) and Cr(II),
with acetates of at least element $M^1$ from the group consisting of
Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II) and Cr(III)
in the presence of at least one water-miscible ligand $L^2$ from the group consisting of alcohols, aldehydes, ketones, ethers, polyethers, esters, urea derivatives, amides, nitrites and sulfides.

3. A mixture of multimetal cyanide complexes of the formula (I)

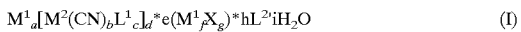

where $M^1$, $M^2$, $L^1$, X, $L^2$, a, b, c, d, e, f, g, h, i have the meanings stated in claim 1 and which can be prepared as stated in claim 1
where at least 20% by weight of the mixture consists of complexes which show the reflections stated in claim 1.

4. A complex as claimed in claim 1, wherein the cyanometalic acids are obtained from alkali metal or alkaline earth metal cyanometalates by reaction with acidic ion exchangers.

5. A complex as claimed in claim 1, which has one or more of the following features:
$M^1$ is ZNn(II)
$M^2$ is Co(III) and/or Fe(III)
$L^1$ is CN
$L^2$ is tert-butanol.

6. A mixture of multimetal cyanide complexes of the formula (I)

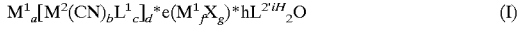

where $M^1$, $M^2$, $L^1$, X, $L^2$, a, b, c, d, e, f, g, h, i have the meanings stated in claim 2, and which can be prepared as stated in claim 2,
where at least 20% by weight of the mixture consist of complexes which show the reflections stated in claim 2.

7. A catalyst comprising complexes as claimed in claim 1 with or without a carrier.

8. A process for preparing polyetherpolyols by reacting diols or polyols with ethylene oxide, propylene oxide, butylene oxide or mixtures thereof, wherein the reaction is carried out in the presence of a catalyst as claimed in claim 7.

9. A process for the formation of a crystalline multimetal cyanide complex of the formula (I)

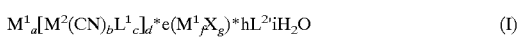

where
$M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III), $M^2$ is at least one element from the group consisting of Fe(II), Fe(III), Co(III), Cr(III), Mn(II), Mn(III), Ir(III), Rh(II), Ru(II), V(IV), V(V), Co(II) and Cr(II), $L^1$ is at least one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, aldehydes, ketones, ethers, polyethers, esters, urea derivatives, amides, nitriles and sulfides, a, b, c, d, e, f, g, h, i, are integers, with a, b, c, and d being chosen so that the electrical neutrality condition is satisfied, and f and g being chosen so that the electrical neutrality condition is satisfied, and the X-ray diffractogram thereof shows reflections at least at the d values of 6.10 Å±0.04 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å when X is a formate anion, the X-ray diffractogram thereof shows reflections at least at the d values of 5.20 Å±0.02 Å
4.80 Å±0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å when X is an acetate anion, and the X-ray diffractogram thereof shows reflections at least at the d values of 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å when X is a propionate anion, the process comprising the steps of:

reacting at least one cyanometalic acid of at least one element $M^2$ selected from the group consisting of Fe(II), Fe(III), Co(III), Cr(III), Mn(II), Mn(III), Ir(III), Rh(III), Ru(II), V(IV), V(V), Co(II) and Cr(II), with at least one formate, acetate or propionate of at least one element $M^1$ selected from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), Cu(II), and Cr(III)

in the presence of at least one water-miscible $L^2$ selected from the group consisting of alcohols, aldehydes, ketones, ethers, polyethers, esters, urea derivatives, amides, nitrites and sulfides.

* * * * *